(12) United States Patent
Luse et al.

(10) Patent No.: US 6,823,421 B2
(45) Date of Patent: Nov. 23, 2004

(54) METHOD, APPARATUS, AND SYSTEM FOR MAINTAINING CONFLICT-FREE MEMORY ADDRESS SPACE FOR INPUT/OUTPUT MEMORY SUBSYSTEMS

(75) Inventors: Paul E. Luse, Chandler, AZ (US); Mark L. Brown, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 370 days.

(21) Appl. No.: 10/126,759

(22) Filed: Apr. 19, 2002

(65) Prior Publication Data

US 2003/0200358 A1 Oct. 23, 2003

(51) Int. Cl.[7] .......................... G06F 15/00; G06F 13/38; G06F 12/00
(52) U.S. Cl. ...................... 710/314; 710/306; 711/202
(58) Field of Search .............................. 710/100, 314, 710/306, 310, 52, 74, 305; 711/200, 202, 118, 154; 712/37; 370/402

(56) References Cited

U.S. PATENT DOCUMENTS

| | | | |
|---|---|---|---|
| 5,561,814 A | * 10/1996 | Glew et al. .................... 710/13 |
| 5,734,847 A | 3/1998 | Garbus et al. |
| 5,838,935 A | 11/1998 | Davis et al. |
| 5,848,249 A | 12/1998 | Garbus et al. |
| 5,884,027 A | 3/1999 | Garbus et al. |
| 5,954,812 A | * 9/1999 | Shiell et al. ................... 712/39 |
| 6,070,182 A | 5/2000 | Rao et al. |
| 6,263,404 B1 | * 7/2001 | Borkenhagen et al. ...... 711/137 |
| 6,681,311 B2 | * 1/2004 | Gaskins et al. ............. 711/203 |

OTHER PUBLICATIONS

"SPARC64: a 64–b 64–active–instruction out–of–order— execution MCM processor" by Williams, T.; Parker, N.; Shen, G. (abstract only). Publication date:Nov. 1995.*
"Cache design for eliminating the sddress oranslation bottleneck and reducing the tag area cost" by Yen–Jen chang; Feipei Lai, Shang–jang Ruan (abstract only) Publication date:Sep. 16–18, 2002.*

* cited by examiner

*Primary Examiner*—Gopal C. Ray
(74) *Attorney, Agent, or Firm*—Blakely, Sokoloff, Taylor & Zafman LLP

(57) ABSTRACT

According to one embodiment of the present invention, an apparatus is provided which includes a first address translation unit and a second address translation unit. The first address translation unit is programmed for a minimum amount of memory addresses required to accept control transactions on a first bus. The second address translation unit is programmed to a memory address range that corresponds to an amount of local memory for caching operations between the first I/O processor and a first I/O interconnect device and an amount of memory space required by the I/O interconnect device. The apparatus includes logic to determine, upon receiving an incoming host request, whether a reply address corresponding to the host request overlaps with the memory address range programmed for the second address translation unit. The apparatus further includes logic to dynamically alter a data flow between the first I/O interconnect device and the host.

29 Claims, 5 Drawing Sheets

METHOD, APPARATUS, AND SYSTEM FOR MAINTAINING CONFLICT-FREE MEMORY ADDRESS SPACE FOR INPUT/OUTPUT MEMORY SUBSYSTEMS

FIELD OF THE INVENTION

The present invention relates to field of data transfer technology and input/output (I/O) processing. More specifically, the present invention relates to a method, apparatus, and system for maintaining a conflict-free private memory address space for I/O subsystems through a dynamic data flow architecture.

BACKGROUND OF THE INVENTION

Presently, computer systems employ a wide variety of peripheral components or input/output (I/O) devices. For example, a typical computer system usually contains a monitor, a keyboard, a mouse, a floppy drive, a network controller, a disk drive or an array of disk drives, and optionally, a printer. High performance computer systems such as servers have more complex I/O device requirements.

Typically, a host processor of the computer system loads a software driver for each of the devices that the computer system supports. These drivers are loaded into the memory of the system host processor and address space must be allocated to these devices. In addition, in operation, these devices generate interrupts that contend for the processing time of the host processor.

Generally, intelligent I/O systems, such as redundant array of independent disks (RAID) technology, RAID add-in cards, RAID on motherboard implementations (RAID I/O Subsystems) or other I/O technology based on an I/O Processor (IOP), such as those available from the Intel Corporation, contain a local memory subsystem provided by the IOP by means of an integrated memory controller unit and the physical memory itself. The memory is used by the embedded RAID application software running on the IOP. Some of this memory is typically used to provide caching functions for data in either upstream or downstream directions. For example, the caching of data can increase write performance by providing the host with immediate completion replies of write operations while holding onto that operation's data in local memory until such time as it is passed to the I/O interconnect device for processing. While this invention can apply to other I/O technologies, RAID will be the example used herein for the purposes of illustrations and explanations.

Generally, a typical RAID I/O subsystem includes a primary PCI bus that is connected to a host bus and a secondary PCI bus that is connected to an I/O interconnect. Placing the I/O interconnect device on the secondary bus allows the RAID firmware to "hide" the I/O interconnect device from the host so that the host does not attempt to configure and control the device. Because the host no longer configures the I/O interconnect device, the RAID I/O subsystem is responsible for allocating any PCI memory address space requirements to the I/O interconnect device. This particular requirement is also referred to herein as requirement # or need #1 for private memory where private memory is now defined as address spaces for use exclusively by the RAID I/O subsystem without interference with normal host operations. Another requirement (also referred to as requirement #2 or need #2 herein) for private memory arises from the physical location of the I/O interconnect device and the requirement of RAID I/O subsystem to utilize its local memory subsystem for caching purposes. In order for the I/O interconnect device to bus master data from the IOP's local memory subsystem to its storage devices, or vice-versa, it utilizes the secondary PCI bus provided by the IOP and access the local memory subsystem through, in the case of an IOP, a secondary Address Translation Unit (SATU), which is also a PCI device requiring PCI memory address space. Both of these needs require that neither the I/O interconnect device or the SATU address range interfere with normal host operations.

Typical IOPs provide a mechanism for isolating addresses between the I/O interconnect device and the IOP by means of registers within the integrated PCI—PCI bridge that can be programmed to prevent the forwarding of a specified range of addresses upstream. This is not, however, a complete solution because it does not guarantee that the I/O interconnect device or SATU address ranges chosen will not potentially conflict with the memory range that a particular host request has specified for its reply buffer (e.g., location where the host has requested the RAID I/O subsystem read or write data into system memory). One known method for insuring that the SATU address range chosen will not potentially conflict with a host reply buffer is to program the Primary Address Translation Unit (PATU) to a range sufficiently large enough to represent the amount of local memory desirable for use by caching between the RAID core and the I/O interconnect via the SATU. This method is inefficient because (a) the PATU does not need this much address space, it is wasting addresses in the host memory space that might be needed by other adapter cards or internal operating system structures such as Page Table Entries and (b) many operating systems have a limit of 64 megabytes of addresses that they will allocate to a single device thus limiting the amount of local memory available to a RAID I/O subsystem to 64 MB where the IOP itself may have a limit of up to 1 gigabyte or more.

BRIEF DESCRIPTION OF THE DRAWINGS

The features of the present invention will be more fully understood by reference to the accompanying drawings, in which.

DETAILED DESCRIPTION

Figure 1:
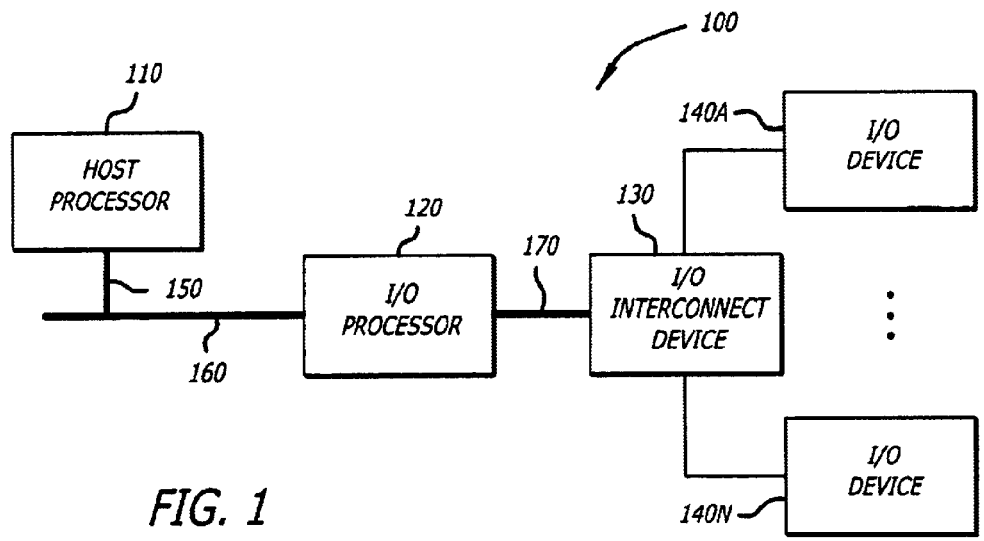
FIG. 1 shows a block diagram of one embodiment of a system in which the teachings of the present invention are implemented.

FIG. 1 shows a block diagram of one embodiment of a system 100 in which the teachings of the present invention are implemented. As shown in FIG. 1, the system 100 includes a host processor 110, an I/O processor 120, an I/O interconnect device 130 which is coupled to one or more I/O devices 140A-140N. In one embodiment, the host processor 110 communicates with the I/O processor via a host bus 150 and bus 160. The I/O processor 120 is coupled to I/O interconnect device 130 via bus 170. In one embodiment, bus 160 is a primary PCI bus and bus 170 is a secondary PCI bus in accordance with the Peripheral Component Interconnect (PCI) Local Bus Specification, Rev. 2.1, published by the PCI Special Interest Group of Portland, Oreg. In one embodiment, bus 160 and bus 170 each may be 32 or 64 bits wide. For the purposes of the present specification, the term "host processor" refers to any machine that is capable of executing a sequence of instructions and shall be taken to include, but not be limited to, general purpose microprocessors, special purpose microprocessors, graphics controller, audio processors, video processors, multi-media controllers and microcontrollers. In one embodiment, the host processor 110 may be an Intel Architecture (IA) microprocessor that is capable of executing an Intel Architecture instruction set. The I/O processor 120 is described in more details below.

Figure 2:
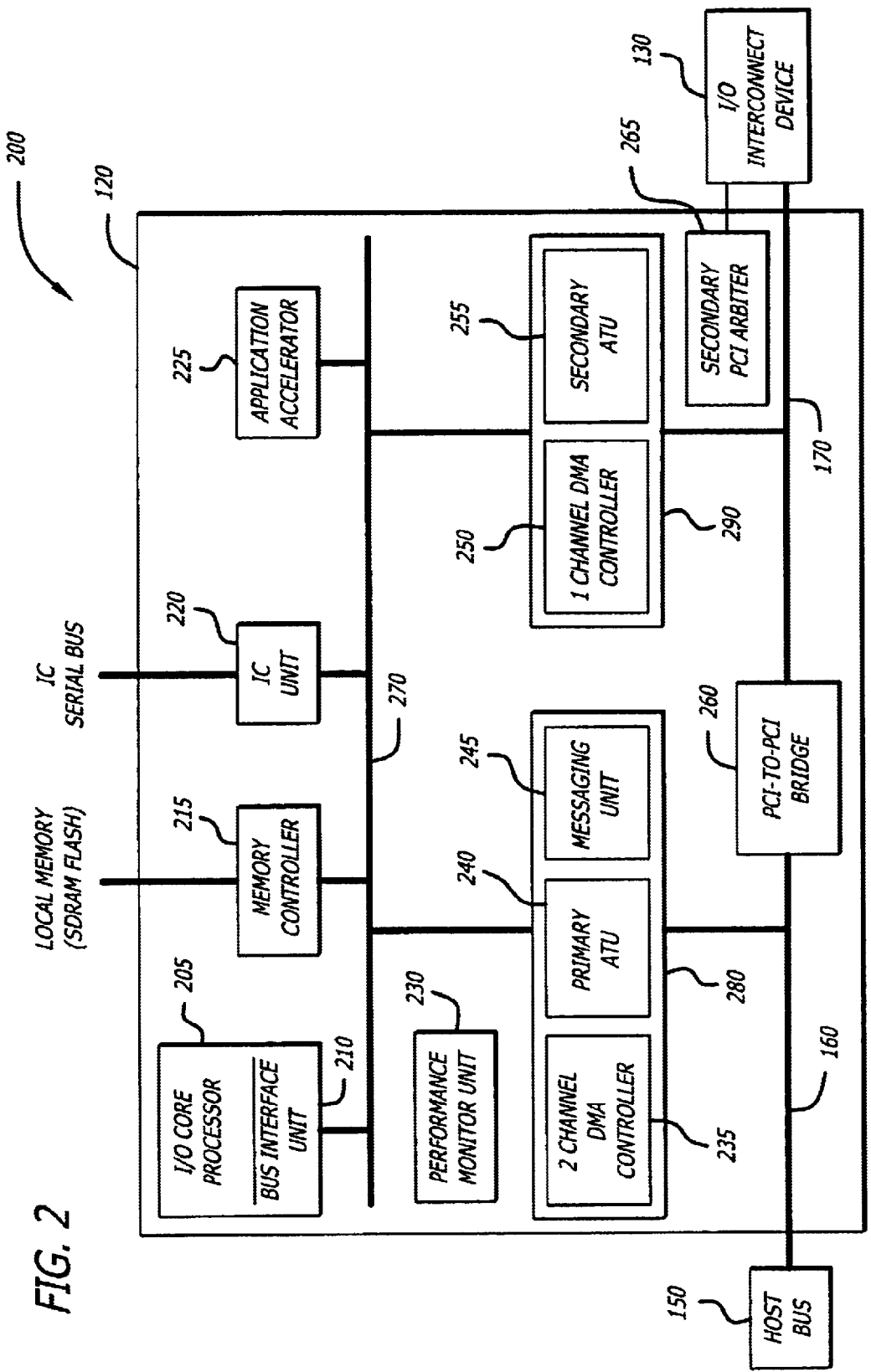
FIG. 2 is a block diagram of one embodiment of an Input/Output (I/O) processor according to the teachings of the present invention.

FIG. 2 is a block diagram of one embodiment 200 of I/O processor (also called IOP herein) 120 according to the teachings of the present invention. As shown in FIG. 2, IOP 120 generally includes a local or core processor 205, a bus interface unit 210, a memory controller 215, an I2C unit 220, and an application accelerator 225. These components are connected to an internal or local bus 270. The IOP 120 further may include a performance monitor unit 230, 2-channel DMA controller 235, primary address translation unit (PATU) 240, messaging unit 245, 1-channel DMA controller 250, and secondary address translation unit (SATU) 255, which are also connected to internal or local bus 270. In addition, IOP 120 also includes a secondary PCI arbiter 265 and a PCI-to-PCI bridge 260.

Local or core processor 205 can be coupled to the bus interface unit 210. Local or core processor 205 communicates with other components of the IOP 120 through the bus interface 210 and the local or internal bus 270. In one embodiment, the local or core processor 205 can be an Intel i960 JT processor with a clock speed of 100 Megahertz (MHz), a 16K I-Cache, and a 4K D-Cache. Memory controller 215 includes an SDRAM interface to communicate with local SDRAM memory and a flash interface to communicate with local flash memory.

PCI-to-PCI bridge 260 generally connects the primary PCI bus 160 and the secondary PCI bus 170. In one embodiment, the PCI-to-PCI bridge 260 complies with the PCI-to-PCI Bridge Architecture Specification published by the PCI Special Interest Group (SIG). The PCI-to-PCI bridge 260 generally allows transactions on one PCI bus to be forwarded to the other PCI bus. The PCI-to-PCI bridge 260, in one embodiment, has dedicated PCI configuration space accessible through the primary PCI bus 160.

PCI-to-PCI bridge 260 is generally programmed with a contiguous range of addresses within the memory and I/O address spaces, which then becomes the range of valid addresses within the secondary PCI address space. Any address present on the primary side of the bridge which falls within the programmed secondary space can be forwarded from the primary to the secondary side while addresses outside the secondary address space are ignored by the bridge. The secondary side of the bridge can work in reverse of the primary side, ignoring any addresses within the programmed secondary address space and forwarding any addresses outside the secondary space to the primary side.

Figure 3:
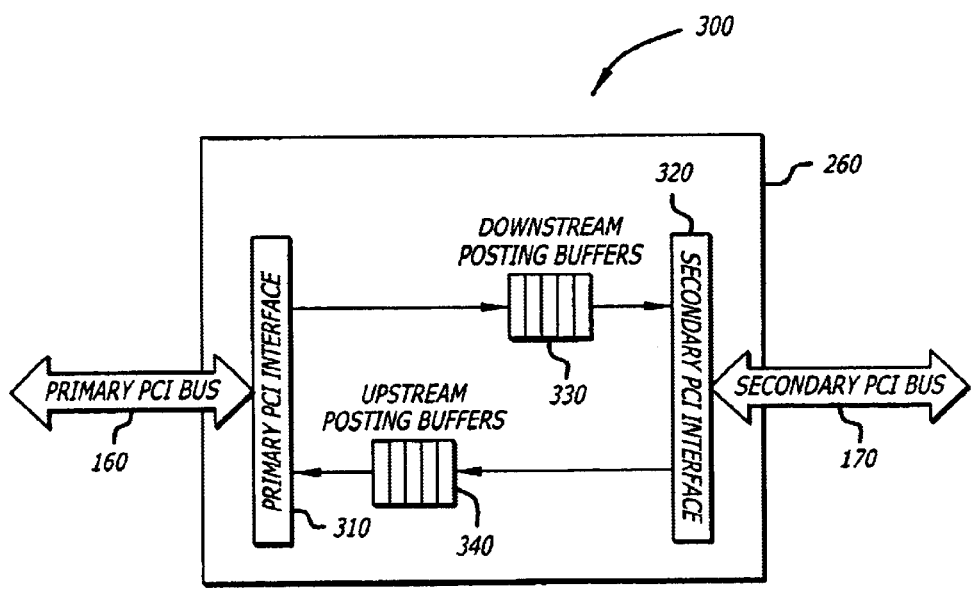
FIG. 3 illustrates a block diagram of one embodiment of a PCI-to-PCI bridge.

FIG. 3 shows a block diagram of one embodiment 300 of PCI-to-PCI bridge 260 in accordance with one embodiment of the present invention. In this embodiment, PCI-to-PCI bridge 260 can be logically organized into the following major components: primary PCI interface 310, a secondary PCI interface 320, downstream posting buffers 330, and upstream posting buffers 340.

Primary PCI interface 310 of the PCI-to-PCI bridge 260 can act either as a target or an initiator of a PCI bus transaction. Accordingly, the primary PCI interface 310 can implement both an initiator (master) and a target (slave) PCI device. When the transaction is initiated on the secondary bus 170, the primary master state machine completes the transaction (write or read) as if it was the initiating device. Furthermore, the primary PCI interface 310, as a PCI target for transactions that need to complete on the secondary PCI bus 170, can accept the transaction and forward the request to the secondary side. Primary PCI interface 310 is generally responsible for PCI command interpretation, address decoding, and error handling.

Secondary PCI interface 320 of the PCI-to-PCI bridge 260 generally functions in almost the same manner as the primary PCI interface 310. Similar to the primary PCI interface 310, the secondary PCI interface 320 can implement both a master PCI device and a slave PCI device. As a slave or target device, the secondary PCI interface 320 can claim PCI transactions that may not fall within the secondary memory or I/O address space of the PCI-to-PCI bridge, and forward these transactions to the primary side. As a master or initiating device, the second PCI interface 320 can generally be responsible for completing transactions initiated on the primary side of the bridge.

In one embodiment, the secondary PCI interface 320 can use inverse decoding of the address registers of the bridge 260 and generally forwards addresses within the primary address space across the bridge 260. In addition, the secondary PCI interface 320 can also implement a separate address space for private PCI devices on the secondary PCI bus 170 where the interface would ignore and do not forward a range of addresses defined at configuration time by the IOP. Also as a special mode of operation, the secondary PCI interface 320 can perform positive address decoding based upon its own set of memory and I/O address registers.

In one embodiment, the PCI-to-PCI bridge 260 implements downstream posting buffers and upstream posting buffers to generally hide the latency incurred during transactions to the opposite side of the PCI-to-PCI bridge 260. In this embodiment, the PCI-to-PCI bridge 260 uses the downstream posting buffers 330 for data flowing from the primary PCI interface 310 to the secondary PCI interface 320, and the upstream posting buffers 240 for data flowing from the secondary PCI interface 320 to the primary PCI interface 310.

In one embodiment, IOP 120 provides an interface between the PCI buses 160, 170 and the local bus 270. In one embodiment, the interface between the PCI buses and the local bus may include mess aging unit 245 and two address translation u nits (ATU), including primary ATU 240 and a secondary ATU 255. Primary ATU provides direct access between the primary PCI bus 160 and the local bus 270. Secondary ATU 255 provides direct access between the secondary PCI bus 170 and the local bus 270.

Primary ATU 240 and secondary ATU 255 can support transactions from both directions through the IOP 120. Primary ATU 240 allows PCI masters on the primary PCI bus 160 to initiate transactions to the local bus 270 and also facilitates the local or core processor 205 to initiate transactions to the primary PCI bus 160. Secondary ATU 255 performs similar function, but on the secondary PCI bus 170 and for secondary PCI bus masters. Transactions initiated on a PCI bus and targeted the local bus can be referred to as inbound transactions. Transactions initiated on the local bus and targeted a PCI bus can be referred to as outbound transactions.

During inbound transactions, the ATU generally converts PCI addresses (initiated by a PCI bus master) to local processor addresses and initiates the data transfer on the local bus. During outbound transactions, the ATU generally converts local or core processor addresses to PCI addresses and initiates the data transfer on the respective PCI bus.

DMA controllers 235 and 250 generally facilitate data transfer between the PCI bus agents and the local memory. In one embodiment, as shown in FIG. 2, there are three DMA channels to accommodate data transfer, including two DMA channels 235 for the primary PCI bus 160 and one DMA channel 250 for the secondary PCI bus 170.

In one embodiment, the messaging unit 245 conforms to the Intelligent Input/Output ($I_2O$) specification, published by the $I_2O$ Special Interest Group. The $I_2O$ specification generally provides a common input/output (I/O) device driver that is independent to both the specific controlled device and the host operating system. The $I_2O$ architecture facilitates intelligent I/O subsystems by supporting message passing between multiple independent processors.

Memory controller 215 allows direct control of local memory. In one embodiment, local memory can include a local SDRAM and flash subsystem. In an alternative embodiment, local memory can include other types of memory devices such as DRAM, read-only-memory (ROM), etc.

Inter-Integrated Circuit ($I^2C$) bus interface 220 allows the local or core processor to serve as a master and slave device residing on the $I^2C$ bus. In one embodiment, the $I^2C$ bus can be a serial bus to generally relay status and reliability information on the IOP 120 to a device (not shown) external to the IOP 120.

IOP 120 includes an internal arbiter (IARB) (not shown) to generally arbitrate the multiple agents or components on the internal or local bus 270, and a secondary arbiter (SARB) 265 to generally arbitrate the multiple agents or components on the secondary PCI bus 170.

Performance monitor (PMON) 230 can be used to generally gather performance measurements that can be used typically to refine code to improve system level performance. In one embodiment, PMON 230 supports a plurality of modes which can be used to measure occurrence and duration events on the different buses including the primary PCI bus 160, the secondary PCI bus 170, and the local or internal bus 270.

Application Accelerator Unit (AAU) 225 generally provides hardware acceleration of XOR functions commonly used in RAID algorithms. In addition, the AAU 225 can provide block moves within local memory, interfaces the internal bus 270 and operates on data within the local memory. In one embodiment, the AAU 225 is programmable through the local core processor 205 and supports chaining and unaligned data transfers.

It should be noted that the functional components, as shown in FIG. 2 and described above, could be implemented in hardware. However, some or all of these functional components can also be implemented using software code segments. Each of the code segments may include one or more programming instructions. If the aforementioned functional components are implemented using software code segments, these code segments can be stored on a machine-readable medium, such as floppy disk, hard drive, CD-ROM, DVD, tape, memory, or any storage device that is accessible by a computing machine.

As described herein, the IOP 120 supports private PCI devices on the secondary PCI bus 170. The PCI-to-PCI bridge 260 and the address translation units work together to hide private devices from PCI configuration cycles and allow these hidden devices to use a private PCI address space. At initialization, these private PCI devices can be hidden from the host processor because they generally do not respond to PCI configuration cycles that the host processor generates. Rather, the secondary ATU 255 can be used to generate PCI configuration cycles to configure the private PCI devices. In addition, the private PCI devices can be accessible by other PCI devices, both private and non-private, on the secondary PCI bus 170. The private PCI devices can be accessed by the use of a private address space.

Referring again to FIG. 2, it can be seen that the I/O interconnect device 130 is physically connected to the secondary PCI segment 170 of the I/O subsystem 200, in this case the segment is provided via the integrated PCI-to-PCI bridge 260 within the IOP 120 itself. Placing the I/O interconnect device 130 on the secondary PCI bus 170 allows the RAID firmware to "hide" the I/O interconnect device 130 from the host 110 so that the host 110 does not attempt to configure and control the device. One of the goals of any RAID I/O subsystem is to abstract from the host the details of the interconnect subsystem and present one or more logical storage units independent of I/O interconnect type or number of physical storage devices present.

As mentioned above, hiding the I/O interconnect device 130 from the host 110 presents a challenge in designing and implementing RAID I/O subsystem architecture. Because the host no longer configures the I/O interconnect device 130, the RAID I/O subsystem (e.g., IOP 120) is responsible for allocating any PCI memory address space requirements to the I/O interconnect device 130. This is referred to as requirement #1 or Need #1 for private memory where private memory is defined as address spaces for use exclusively by the RAID I/O subsystem without interference with normal host operations. Requirement #2 or Need #2 for private memory arises from the physical location of the I/O interconnect device 130 and the requirement of RAID I/O subsystem to utilize its local memory subsystem for caching purposes. In order for the I/O interconnect device 130 to bus master data from the IOP's local memory subsystem to its storage devices, the I/O interconnect device 130 utilizes the secondary PCI bus 270 provided by the IOP 120 and access the local memory subsystem through the SATU 255, which is also a PCI device requiring PCI memory address space. Both of these needs require that the I/O interconnect device 130 and the SATU 255 address range not interfere with normal host operations.

As explained above, a typical IOP such as IOP 120 shown in FIG. 2 provides a mechanism for isolating addresses between the I/O interconnect device and the IOP by means of registers within the integrated PCI-PCI bridge 260 that can be programmed to prevent the forwarding of a specified range of addresses upstream. However, this is not a complete solution because it does not guarantee that the I/O interconnect device 130 or SATU 255 address ranges chosen will not potentially conflict with the memory range that a particular host request has specified for its reply buffer (e.g., location where the host has requested the RAID I/O subsystem read or write data into system memory. It should be noted that a reply buffer may not be a contiguous address range but may be in the form of one or more scatter-gather lists or page lists in one or more OS dependent formats). One known method for insuring that the SATU address range chosen will not potentially conflict with a host reply buffer is to program the Primary Address Translation Unit (PATU) 240 to a range sufficiently large enough to represent the amount of local memory desirable for use by caching between the RAID core and the I/O interconnect 130 via the SATU 255. This method is inefficient because: (a) the PATU 240 does not need this much address space. Thus it wastes addresses in the host memory space that might be needed by other adapter cards or internal operating system structures such as Page Table Entries and (b) many operating systems have a limit of 64 megabytes of addresses that they will allocate to a single device thus limiting the amount of local memory available to a RAID I/O subsystem to 64 MB where the IOP itself may have a limit of up to 1 gigabyte.

One embodiment of the present invention provides a method, apparatus, and system for solving the problems described above. In one embodiment, existing hardware and a dynamic data flow architecture are utilized through software to resolve the issues and limitations previously described. A method in accordance to one embodiment of the present invention is described below:

Instead of programming the PATU 240 to represent the total memory range for local memory, the PATU 240 is programmed for the range required for the minimal amount of addresses required to accept control transactions on the primary PCI bus 160, which is typically less than one megabyte in various applications.

Instead of programming the SATU 255 to the range that the PATU 240 was given by the host 110, the SATU 255 is programmed with a large address range with base address X and size X+Y where Y represents a total amount of local memory desired for use by caching between the RAID core and the I/O interconnect 130 plus the amount of PCI memory space required by the I/O interconnect device as determined by the IOP during PCI configuration time. Accordingly, Y is the amount of memory for caching in addition to the amount of memory needed by the I/O interconnect device.

Upon receipt of incoming host read or write requests (which will result in a write to or a read of a host reply buffer) the RAID core examines the address of the host reply buffer.

If the host reply buffer does not overlap with the SATU address range (e.g., X to X+Y), the transaction proceeds as it normally would and the standard data flow architecture applies. Typically this means that either the data is bus mastered through the bridge 260, or in other cases, depending on the application, the data may be brought back into the IOP 120 for additional processing.

If the host reply buffer overlaps with the SATU address range (e.g., X to X+Y), then the data flow architecture is dynamically altered or changed. In this case, the RAID core now acts as the reply buffer with respect to the I/O interconnect device 130. After the I/O interconnect device 130 has bus mastered the requested data to local memory through the SATU 255, the RAID core re-bus masters the data to the original host reply buffer through the PATU 240. The host is unaware and agnostic of the fact that the IOP DMA unit returns the data instead of the I/O interconnect 130.

Figure 4:
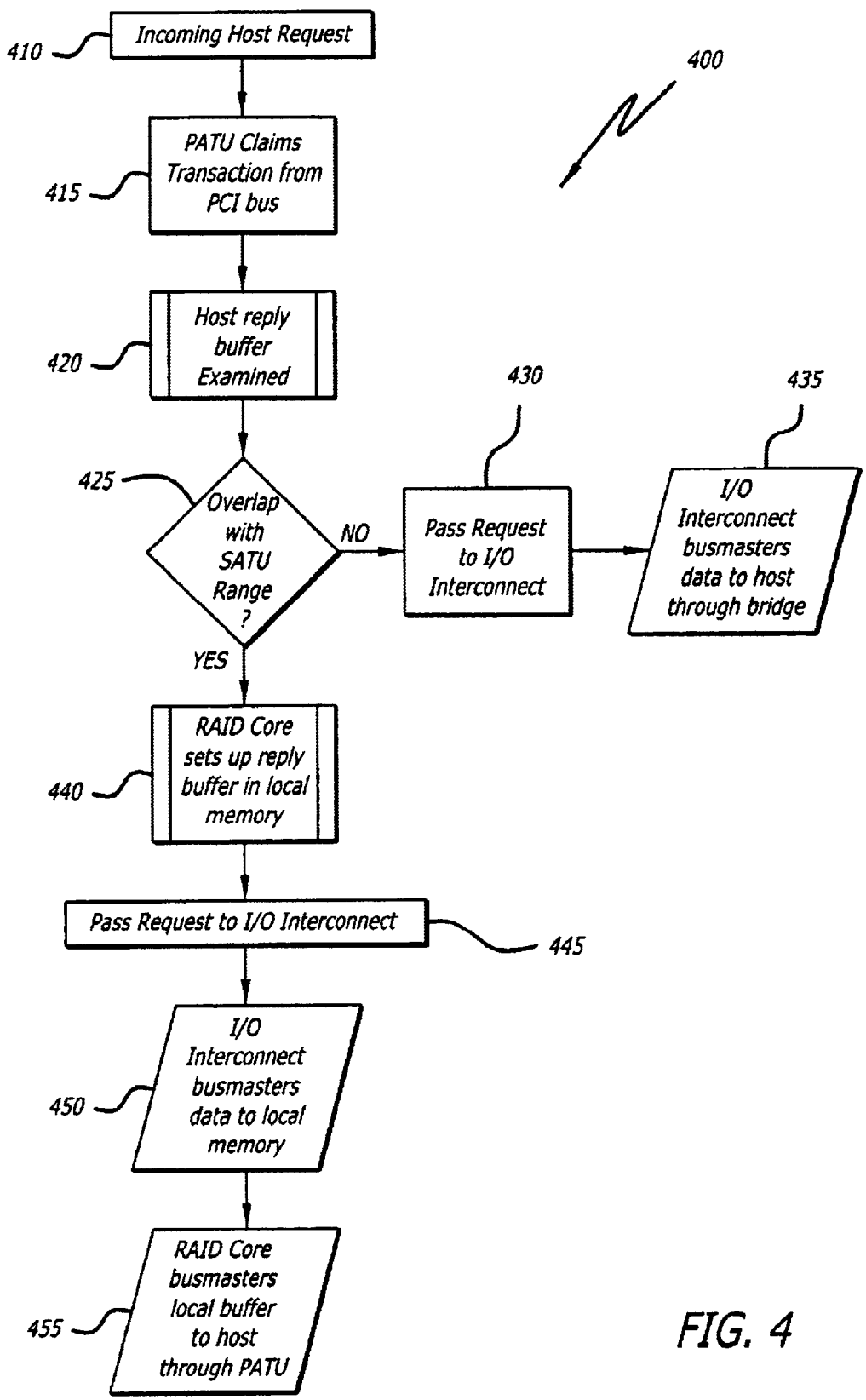
FIG. 4 shows a flow diagram of a dynamic data flow architecture in accordance with one embodiment of the present invention.

FIG. 4 shows a flow diagram of a dynamic data flow architecture 400 in accordance with one embodiment of the present invention. At block 410, an incoming host request is received from the host. At block 415, the PATU claims transaction from the primary PCI bus. At block 420, the host reply buffer is examined to determine whether the host reply buffer address overlaps with the SATU address range. At decision block 425, if the host reply buffer address overlaps with the SATU address range, the process proceeds to block 440. Otherwise, the process proceeds to block 430. At block 430, the host request is passed to the I/O interconnect device. At block 435, the I/O interconnect device bus masters data to host through the bridge (e.g., PCI-to-PCI bridge). At block 440, RAID core sets up a reply buffer in local memory. At block 445, the host request is passed to the I/O interconnect device. At block 450, the I/O interconnect device bus masters data to local memory. At block 455, the RAID core bus masters data from local buffer to host through the PATU.

Figure 5:
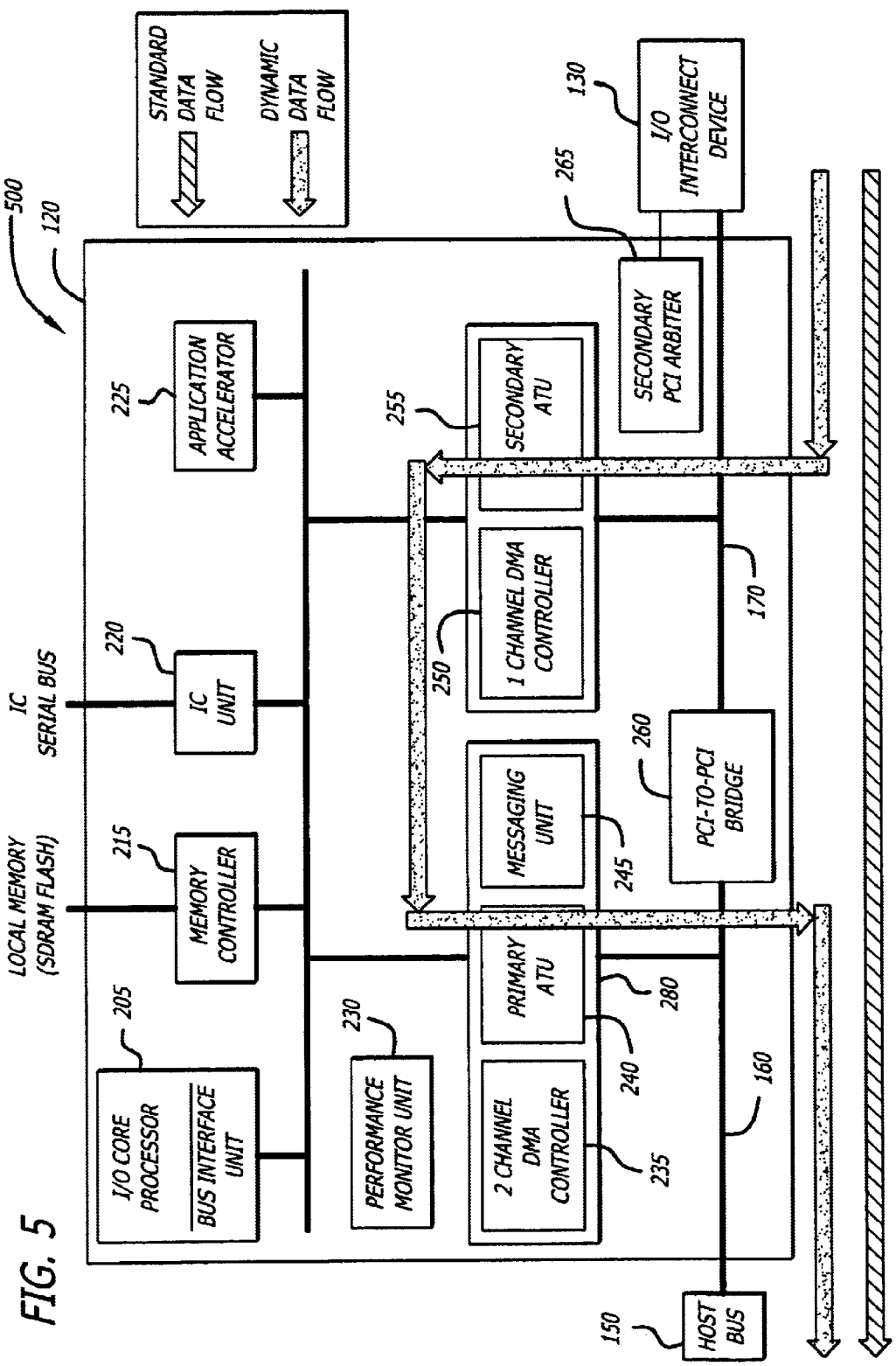
FIG. 5 illustrates a block diagram of an I/O processor with dynamic data flow architecture in accordance with one embodiment of the present invention.

FIG. 5 illustrates a block diagram of I/O processor 120 with dynamic data flow architecture in accordance with one embodiment of the present invention. As shown in FIG. 5, when the host initiates a request for data transfer, there are two different scenarios of data transfer that can take place depending on whether the host reply buffer address overlaps with the SATU address range. In the first scenario (referred to as the standard data flow herein and in FIG. 5), where the host reply buffer address does not overlap with SATU address range, data is bus mastered from the I/O interconnect device 130 to the host through the PCI-to-PCI bridge 260. In the second scenario (referred to as the dynamic data flow in FIG. 5), where the host reply buffer address overlaps with SATU address range (address conflict between host reply buffer and SATU address range), the RAID core acts the reply buffer with respect to the I/O interconnect device. In this scenario, requested data is bus mastered from the I/O interconnect device to the local memory through the SATU. The requested data is then bus mastered by the RAID core to the original host reply buffer through the PATU.

Figure 6:
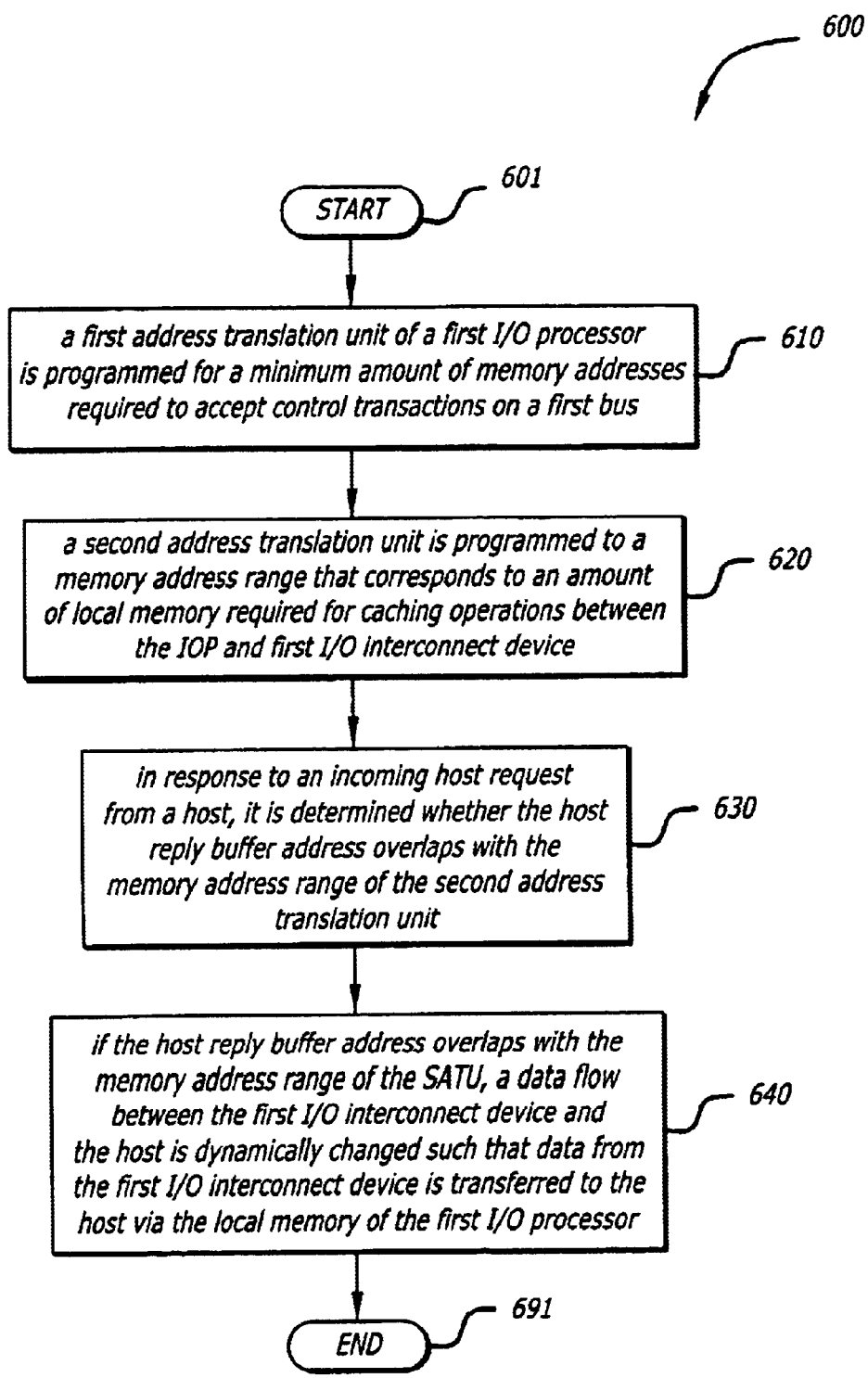
FIG. 6 is a flow diagram of one embodiment of a method according to the teachings of the present invention.

FIG. 6 is a flow diagram of one embodiment of a method 600 according to the teachings of the present invention. At block 610, a first address translation unit (e.g., the PATU 240) of a first I/O processor (e.g., IOP 120) is programmed for a minimum amount of memory addresses required to accept control transactions on a first bus (e.g., the primary PCI bus 160). At block 620, a second address translation unit (e.g., the SATU 255 of the IOP 120) is programmed to a memory address range that corresponds to an amount of local memory required for caching operations between the IOP and a first I/O interconnect device (e.g., interconnect device 130). At block 630, in response to an incoming host request from a host (e.g., host 110), it is determined whether the host reply buffer address overlaps with the memory address range of the second address translation unit. At block 640, if the host reply buffer address overlaps with the memory address range of the SATU, a data flow between the first I/O interconnect device and the host is dynamically changed such that data from the first I/O interconnect device is transferred to the host via the local memory of the first I/O processor.

While certain exemplary embodiments have been described and shown in accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
    programming a first address translation unit in a first input/output (I/O) processor for a minimum amount of memory addresses required to accept control transactions on a first bus;

programming a second address translation unit in the first I/O processor to a memory address range that corresponds to an amount of local memory for caching operations between the first I/O processor and a first I/O interconnect device and an amount of memory required by the first I/O interconnect device;

in response to an incoming host request being received from a host, determining whether the host request's reply address overlaps with the memory address range for the second address translation unit; and if the host request's reply address overlaps with the memory address range, dynamically changing a data flow between the first I/O interconnect device and the host such that data from the first I/O interconnect device is transferred to the host via the local memory of the first I/O processor.

2. The method of claim 1 further including:

if the host request's reply address does not overlap with the memory address range programmed for the second address translation unit, maintaining a standard data flow between the first I/O interconnect device and the host such that data from the first I/O interconnect device is transferred to the host via a first bridge.

3. The method of claim 2 wherein maintaining the standard data flow includes:

passing the host request to the first I/O interconnect device; and transferring data from the first I/O interconnect device to the host via the first bridge.

4. The method of claim 3 wherein the first bridge is coupled to the host via a first bus and coupled to the first I/O interconnect device via a second bus.

5. The method of claim 4 wherein the first bus is a primary peripheral component interconnect (PCI) bus, the second bus is a secondary PCI bus, and the first bridge is a PCI-to-PCI bridge.

6. The method of claim 1 wherein dynamically changing the data flow between the first I/O interconnect device and the host includes:

setting up a reply buffer in the local memory of the first I/O processor to receive data from the first I/O interconnect device.

7. The method of claim 6 further including:

passing the host request to the first I/O interconnect device.

8. The method of claim 7 further including:

transferring data from the first I/O interconnect device to the local memory of the first I/O processor.

9. The method of claim 8 further including:

transferring data from the local memory of the first I/O processor to the host via the first address translation unit.

10. The method of claim 1 wherein the first address translation unit is configured as the primary address translation unit for the first I/O processor.

11. The method of claim 1 wherein the second address translation unit is configured as the secondary address translation unit for the first I/O processor.

12. An apparatus comprising:

a first address translation unit programmed for a minimum amount of memory addresses required to accept control transactions on a first bus;

a second address translation unit programmed to a memory address range that corresponds to an amount of local memory for caching operations between the first I/O processor and a first I/O interconnect device and an amount of memory required by the first I/O interconnect device;

logic to determine, upon receiving an incoming host request, whether a reply address corresponding to the host request overlaps with the memory address range programmed for the second address translation unit; and logic to dynamically alter a data flow between the first I/O interconnect device and the host such that data from the first I/O interconnect device is transferred to host via the local memory of the first I/O processor, if the reply address overlaps with the memory address range for the second address translation unit.

13. The apparatus of claim 12 further including:

logic to maintain a standard data flow between the first I/O interconnect device and the host such that data from the first I/O interconnect device is transferred to the host via a first bridge, if the reply address does not overlap with the memory address range for the second address translation unit.

14. The apparatus of claim 12 wherein logic to dynamically alter the data flow between the first I/O interconnect device and the host includes:

logic to set up a reply buffer in the local memory of the first I/O processor to receive data from the first I/O interconnect device.

15. The apparatus of claim 14 further including:

logic to pass the host request to the first I/O interconnect device.

16. The apparatus of claim 15 further including:

logic to transfer data from the first I/O interconnect device to the local memory of the first I/O processor.

17. The apparatus of claim 16 further including:

logic to transfer data from the local memory of the first I/O processor to the host via the first address translation unit.

18. The apparatus of claim 17 wherein logic to maintain the standard data flow includes:

logic to pass the host request to the first I/O interconnect device; and logic to transfer data from the first I/O interconnect device to the host via the first bridge.

19. The apparatus of claim 18 wherein the first bride is coupled to the host via a first bus and coupled to the first I/O interconnect device via a second bus.

20. The apparatus of claim 19 wherein the first bus is a primary peripheral component interconnect (PCI) bus, the second bus is a secondary PCI bus, and the first bridge is a PCI-to-PCI bridge.

21. The apparatus of claim 12 wherein the first address translation unit is configured as the primary address translation unit for the first I/O processor.

22. The apparatus of claim 12 wherein the second address translation unit is configured as the secondary address translation unit for the first I/O processor.

23. A system comprising:

a host processor coupled to transmit data to and receive data from one or more input/output (I/O) devices; and an input/output (I/O) processor coupled to the host processor via a host bus to manage input/output operations with respect to the one or more I/O devices, the I/O processor including:

a first address translation unit programmed for a minimum amount of memory addresses required to accept control transactions on a first bus;

a second address translation unit programmed to a memory address range that corresponds to an amount of local memory for caching operations between the I/O processor and a first I/O interconnect device and an amount of memory required by the first I/O interconnect device;

logic to determine, upon receiving an incoming host request, whether a reply address corresponding to the host request overlaps with the memory address range programmed for the second address translation unit; and logic to dynamically alter a data flow between the first I/O interconnect device and the host processor such that data from the first I/O interconnect device is transferred to host processor via the local memory of the I/O processor, if the reply address overlaps with the memory address range for the second address translation unit.

24. The system of claim 23 wherein the I/O processor further includes:

logic to maintain a standard data flow between the first I/O interconnect device and the host such that data from the first I/O interconnect device is transferred to the host via a first bridge, if the reply address does not overlap with the memory address range for the second address translation unit.

25. The system of claim 24 wherein logic to maintain the standard data flow includes:

logic to pass the host request to the first I/O interconnect device; and logic to transfer data from the first I/O interconnect device to the host via the first bridge.

26. The system of claim 25 wherein the first bride is coupled to the host via a first bus and coupled to the first I/O interconnect device via a second bus.

27. The system of claim 26 wherein the first bus is a primary peripheral component interconnect (PCI) bus, the second bus is a secondary PCI bus, and the first bridge is a PCI-to-PCI bridge.

28. The system of claim 23 wherein logic to dynamically alter the data flow between the first I/O interconnect device and the host includes:

logic to set up a reply buffer in the local memory of the I/O processor to receive data from the first I/O interconnect device;

logic to pass the host request to the first I/O interconnect device;

logic to transfer data from the first I/O interconnect device to the local memory of the I/O processor; and logic to transfer data from the local memory of the I/O processor to the host via the first address translation unit.

29. The system of claim 23 wherein the first address translation unit is configured as the primary address translation unit for the I/O processor and wherein the second address translation unit is configured as the secondary address translation unit for the I/O processor.

* * * * *

UNITED STATES PATENT AND TRADEMARK OFFICE
CERTIFICATE OF CORRECTION

PATENT NO. : 6,823,421 B2
DATED : November 23, 2004
INVENTOR(S) : Luse et al.

It is certified that error appears in the above-identified patent and that said Letters Patent is hereby corrected as shown below:

Column 10,
Line 45, delete "bride" and insert -- bridge --.

Column 12,
Line 3, delete "bride" and insert -- bridge --.

Signed and Sealed this

Twenty-fourth Day of May, 2005

JON W. DUDAS
*Director of the United States Patent and Trademark Office*